United States Patent
Fink

(10) Patent No.: US 9,768,432 B2
(45) Date of Patent: Sep. 19, 2017

(54) CELL CONNECTOR FOR MAKING ELECTRICALLY CONDUCTIVE CONTACT WITH A PLURALITY OF BATTERY CELL TERMINALS, METHOD FOR PRODUCING A CELL CONNECTOR OF THIS KIND, AND BATTERY MODULE HAVING AT LEAST ONE CELL

(71) Applicants: Robert Bosch GmbH, Stuttgart (DE); Samsung SDI Co., Ltd., Yongin-si, Gyeonggi-do (KR)

(72) Inventor: Holger Fink, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/767,006

(22) PCT Filed: Feb. 3, 2014

(86) PCT No.: PCT/EP2014/051984
§ 371 (c)(1),
(2) Date: Aug. 11, 2015

(87) PCT Pub. No.: WO2014/124825
PCT Pub. Date: Aug. 21, 2014

(65) Prior Publication Data
US 2015/0380714 A1  Dec. 31, 2015

(30) Foreign Application Priority Data
Feb. 12, 2013 (DE) .......... 10 2013 202 244

(51) Int. Cl.
*H01M 2/20* (2006.01)
*B23K 26/32* (2014.01)
(Continued)

(52) U.S. Cl.
CPC .......... *H01M 2/206* (2013.01); *B23K 26/244* (2015.10); *B23K 26/32* (2013.01); *B23K 26/323* (2015.10);
(Continued)

(58) Field of Classification Search
CPC .. H01M 2/202; H01M 2/206; H01M 2220/20; B23K 2201/36; B23K 2203/10; B23K 2203/42
See application file for complete search history.

(56) References Cited

U.S. PATENT DOCUMENTS

| 6,261,719 B1 | 7/2001 | Ikeda et al. |
| 2007/0003830 A1* | 1/2007 | Bechtold ............. H01M 2/0242 429/160 |

(Continued)

FOREIGN PATENT DOCUMENTS

| CN | 102263301 A | 11/2011 |
| DE | 101 22 682 A1 | 11/2001 |

(Continued)

OTHER PUBLICATIONS

International Search Report corresponding to PCT Application No. PCT/EP2014/051984, mailed Apr. 28, 2014 and (German English language document) (5 pages).

*Primary Examiner* — Mark F Huff
*Assistant Examiner* — Monique Wills
(74) *Attorney, Agent, or Firm* — Maginot, Moore & Beck LLP

(57) ABSTRACT

A cell connector for making electrically conductive contact with a plurality of battery cell terminals comprises a plurality of sections positioned next to each other including a plurality of first sections composed of an electrically conductive metal material, and at least one second section composed of an electrically insulating plastic. The at least
(Continued)

one second section is positioned between a respective two of the plurality of first sections. The present disclosure further relates to a method for producing a cell connector, in which the at least one second section is connected to the at least two first sections by means of a nano-moulding method. The present disclosure furthermore relates to a battery module having a plurality of battery cells with terminals connected by at least one cell connector.

9 Claims, 2 Drawing Sheets

(51) Int. Cl.
*B23K 26/323* (2014.01)
*B23K 26/244* (2014.01)
*B23K 101/36* (2006.01)
*B23K 103/10* (2006.01)
*B23K 103/12* (2006.01)
*B23K 103/18* (2006.01)
*B23K 103/00* (2006.01)

(52) U.S. Cl.
CPC ......... *H01M 2/202* (2013.01); *B23K 2201/36* (2013.01); *B23K 2203/10* (2013.01); *B23K 2203/12* (2013.01); *B23K 2203/18* (2013.01); *B23K 2203/42* (2015.10); *H01M 2220/20* (2013.01)

(56) References Cited

U.S. PATENT DOCUMENTS

| | | | | |
|---|---|---|---|---|
| 2013/0288094 | A1* | 10/2013 | Noh | H01M 2/1077 429/99 |
| 2014/0017533 | A1* | 1/2014 | Nishihara | H01M 2/06 429/93 |
| 2016/0303828 | A1* | 10/2016 | Sriram | B32B 15/08 |

FOREIGN PATENT DOCUMENTS

| | | |
|---|---|---|
| DE | 10 2009 035 470 A1 | 2/2011 |
| DE | 10 2010 030 809 A1 | 1/2012 |
| DE | 10 2010 043 885 A1 | 3/2012 |

* cited by examiner

CELL CONNECTOR FOR MAKING ELECTRICALLY CONDUCTIVE CONTACT WITH A PLURALITY OF BATTERY CELL TERMINALS, METHOD FOR PRODUCING A CELL CONNECTOR OF THIS KIND, AND BATTERY MODULE HAVING AT LEAST ONE CELL

This application is a 35 U.S.C. §371 National Stage Application of PCT/EP2014/051984, filed on Feb. 3, 2014, which claims the benefit of priority to Ser. No. DE 10 2013 202 244.1, filed on Feb. 12, 2013 in Germany, the disclosures of which are incorporated herein by reference in their entirety.

The disclosure relates to a cell connector for making electrically conductive contact with a plurality of battery cell terminals, wherein the cell connector has a plurality of sections arranged next to one another and a first number of first sections composed of an electrically conductive metal material.

In addition, the disclosure relates to a method for producing a cell connector having a plurality of sections arranged next to one another, wherein a first number of first sections is composed of an electrically conductive metal material.

Furthermore, the disclosure relates to a battery module having a plurality of electrically connected battery cells, wherein the battery cells have in each case at least one cell terminal which is electrically conductively connected to an electrode of the battery cell for making electrically conductive contact with the battery cell and wherein at least a first number of cell terminals is connected by means of a cell connector.

BACKGROUND

Battery modules, such as in particular battery modules designed as energy stores for the drive of hybrid, plug-in hybrid or electric vehicles, usually comprise a plurality of battery cells, wherein the battery cells each have a negative electrode and a positive electrode. For the purpose of making electrically conductive contact with the battery cells, the latter usually have a first cell terminal, which is electrically conductively connected to the negative electrode of a battery cell, and a second cell terminal, which is electrically conductively connected to the positive electrode of a battery cell. The battery cells are electrically connected to one another via the cell terminals using so-called cell connectors, which are used as contact-making elements, to form a battery module.

Various connection types for connecting the battery cells or the battery modules are known. In particular, the cell connectors and the cell terminals can be configured such that they can be screwed to one another, or such that the cell connectors can be screwed onto the cell terminals. As an alternative to a screw connection, an electrically conductive connection of the battery cells can be produced by soldering cell connectors to the cell terminals of the battery cells. A solder connection advantageously usually has, in contrast to a screw connection, a lower electrical contact resistance and enables a permanently stable connection of cell connector and cell terminal. In general, metal strips are used as cell connectors, in particular for the electrically conductive connection of cell terminals of prismatic battery cells, wherein two adjacent cell terminals are connected by means of such a cell connector.

Cell connectors with which an electrically conductive connection can be produced between battery cell terminals are known, for example, from the document DE 10 2010 030 809 A1. The cell connectors in this case comprise at least two connecting sections composed of different electrically conductive metal materials.

Provision is made, in particular, that one connecting section is composed of copper and one connecting section is composed of aluminum.

Furthermore, the connection of groups of battery cells by means of a plurality of cell connector flat conductors is known from the document DE 10 2010 043 885 A1, wherein a cell connector flat conductor connects more than two cell terminals of battery cells to one another.

What is disadvantageous in the case of cell connectors known hitherto is that said cell connectors electrically conductively connect a group of battery cell terminal to one another, with the result that each cell terminal of said group is electrically conductively connected to every other cell terminal of said group. Therefore, in the case of an electrical connection of battery cells to form a battery module, a multiplicity of cell connectors is usually required since, in general, not all cell terminals of a battery module may make electrically conductive contact with one another. The use of a multiplicity of cell connectors goes against the endeavor to reduce the number of components, in particular to simplify handling.

Against this background, it is an object of the disclosure to provide a cell connector which advantageously reduces the number of cell connectors necessary for electrically connecting battery cells, in particular prismatic battery cells, such that a single, preferably integrally designed, cell connector is sufficient to electrically connect a plurality of battery cells.

SUMMARY

In order to achieve the object, a cell connector is proposed for making electrically conductive contact with a plurality of battery cell terminals, wherein the cell connector has a plurality of sections arranged next to one another and a first number of first sections is composed of an electrically conductive metal material, wherein a second number of second sections is composed of an electrically insulating plastic, wherein at least one second section is arranged in each case between at least two first sections. Electrical connection of a plurality of battery cells to form a battery module is advantageously simplified by means of such a cell connector, in particular since a multiplicity of individual cell connectors, which each connect only two battery cell terminals, are not to be brought into contact with the cell terminals of battery cells to be connected. Instead, merely a few cell connectors according to the disclosure are necessary. In particular, the cell connector according to the disclosure can also be configured, owing to the section acting in an electrically insulating manner, such that only a single cell connector according to the disclosure is to be connected to the battery cell terminals of a battery module in order to electrically connect battery cells to one another to form a battery module.

A cell connector according to the disclosure is preferably designed such that it can be connected by means of a laser welding process to the cell terminals of battery cells which are to be electrically connected to one another. The specific configuration of the cell connector, that is to say in particular the arrangement of electrically conductive and electrically insulating section with respect to one another, is advantageously determined by the way in which the battery cells are to be electrically connected to form a battery module. The connection of the battery cells to one another to form a battery module is in this case advantageously less susceptible to error by means of cell connectors according to the disclosure since the manner in which the battery cells are connected to one another is already given by the cell connectors per se. Thus, what is avoided in particular is that the wrong cell terminals make accidental contact with the cell connectors or that cell terminals accidentally do not make contact with cell connectors.

An advantageous configuration of the disclosure provides that the at least one second section is in each case connected to the at least two first sections by means of a nano-molding process. A nano-molding process is, in particular, an injection-molding process in which cavities in the nanometer range occur by chemical pretreatment of a metal, for example an aluminum alloy. Plastic is sprayed onto the metal pretreated in this way, which plastic is particularly strongly connected to the metal. The electrically insulating sections and electrically conductive sections of the cell connector according to the disclosure can therefore advantageously be produced to be particularly flat and material-saving.

According to a preferred configuration of the disclosure, at least one first section is composed of a first metal material and at least one further first section is composed of a second metal material. The first metal material is in this case preferably copper. The second metal material is preferably aluminum. The material of an electrically conductive section of a cell connector according to the disclosure advantageously corresponds to the material of the battery cell terminal which is brought into contact with the respective electrically conductive section of the cell connector.

Advantageously, the at least one first section is connected to the at least one further first section by means of a clinch-joining process. Preferred clinch-joining processes include clinching. A connection of the first sections by means of a clinch-joining process enables in this case a particularly cost-effective and a permanently stable connection of the sections. In particular, clinch-joining processes and nano-molding processes are advantageously suitable for connecting a multiplicity of material combinations to one another, wherein the processes advantageously require less energy to be performed in particular in comparison with welding or soldering methods.

According to another advantageous configuration of the disclosure, the cell connector is designed to be planar with a substantially rectangular cross-section. The length of the cell connector depends in particular on the number of the battery cells to be electrically connected to one another. The thickness of the cell connector is preferably constant over its length, preferably likewise the widths of the cell connector. An electrically conductive section is advantageously designed to be long enough that electrically conductive contact can be made with a number n of cell terminals. That is to say that an electrically conductive section can make electrically conductive contact with only one cell terminal or else two, three, four more cell terminals, depending on how many battery cells are to be connected to form a battery module. According to a preferred configuration of the disclosure, provision is made that the cell connector is designed in the form of a strip in which the electrically conductive sections and electrically insulating sections are arranged in alternating sequence, wherein the sequence of the sections is determined by the type of the connection of battery cells to be connected to form a battery module. However, provision is also made that the cell connector forms a network structure as it were. In order to make contact with a plurality of rows of cell terminals, the cell connector has, in this connection, corresponding rows of sections which are arranged next to each other in a strip-like form and which can be connected to form a single cell connector via connecting sections which may in particular be designed to be electrically insulating. The connecting sections of the cell connector are in this case preferably likewise arranged next to one another in a strip-like manner, wherein rows of connecting sections preferably run orthogonally to the aforesaid strip-like cell connectors. A cell connector such as this advantageously replaces a multiplicity of conventional cell connectors. As a result of this, the connection of battery cells to form a battery module is advantageously simplified. According to the disclosure, an electrically insulating section is arranged between cell terminals or groups of cell terminals which are to be connected to one another in an electrically insulating manner, with the result that no electrically conductive connection exists between said cell terminals.

In order to achieve the object mentioned at the outset, what is also proposed is a method for producing a cell connector having a plurality of sections arranged next one another, in particular a cell connector according to the disclosure, wherein a first number of first sections are composed of an electrically conductive metal material, and at least one second section composed of an electrically insulating plastic is arranged between two first sections, wherein the at least one second section is connected to the at least two first sections by means of a nano-molding process. Advantageously, nano-molding processes are energy efficient. Furthermore, by means of nano-molding processes, it is advantageously possible to produce plastic-metal connections with different metal materials.

An advantageous configuration of the method provides that at least one first section is composed of a first electrically conductive metal material and at least one further first section is composed of a second electrically conductive metal material, wherein the at least one first section is connected to the at least one further first section by means of a clinch-joining process. In this case, in particular, copper is provided as first material and aluminum as second material.

Furthermore, in order to achieve the objects mentioned at the outset, a battery module is proposed having a plurality of battery cells which are electrically connected to one another, wherein the battery cells each have at least one cell terminal which is electrically conductively connected to an electrode of the battery cell in order to make electrically conductive contact with the battery cells, wherein at least a first number of cell terminals are connected by means of a cell connector according to the disclosure. As a result of this, the battery cells are advantageously at least partially electrically connected to one another by means of the cell connector according to the disclosure.

According to an advantageous configuration of the battery module, the battery cells each have a first cell terminal and a second cell terminal, wherein the battery cells are arranged next to one another such that two rows of cell terminals running parallel to one another are formed, wherein the first row of cell terminals is connected to a cell connector according to the disclosure and the second row of terminals is connected to a second cell connector according to the disclosure. As a result of this, the battery cells are advantageously electrically connected to one another by means of the first cell connector and the second cell connector.

Provision is made in particular that the at least one cell connector according to the disclosure, in particular the first cell connector according to the disclosure and the second cell connector according to the disclosure, is/are connected to the cell terminals of the battery cells by means of a laser welding process. Cell terminals of the battery cells are in this case preferably designed with a flat surface. In particular, provision is made that the battery cells are lithium-ion cells, preferably rechargeable lithium-ion cells. The battery cells are preferably designed as prismatic cells.

In particular, provision is made that the individual battery cells are each surrounded by a cell housing from which the cell terminals project. In particular, the battery cells may be connected to form any XsYp configuration by appropriate arrangement of the battery cells by means of the cell connectors according to the disclosure. That is to say that a number Y of battery cells are in each case electrically connected in parallel and a number X of battery cells electrically connected in parallel are connected in series to form a battery module.

BRIEF DESCRIPTION OF THE DRAWINGS

Further advantageous characteristics, features and configuration details of the disclosure are explained in more detail with reference to the exemplary embodiments illustrated in the figures, in which.

DETAILED DESCRIPTION

Figure 1A:
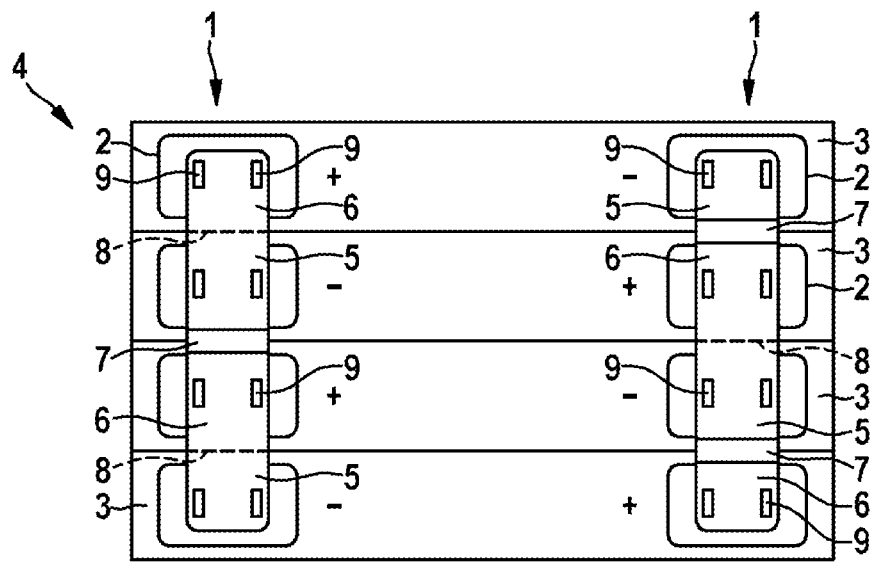
FIG. 1a shows a schematic illustration of a plan view of an exemplary embodiment of a battery module according to the disclosure with cell connectors according the disclosure.

In FIG. 1a, cell connectors 1 according to the disclosure are connected to battery cell terminals 2 of a plurality of battery cells 3. In this case, the battery cells 3 are electrically connected to one another by means of the cell connectors 1 to form a battery module 4. Each cell connector 1 has in this case a plurality of sections 5, 6, 7 arranged next to one another and is designed in a strip-like manner. The sections 5 and the sections 6 are in this case each composed of an electrically conductive metal material. The sections 5 are in this case preferably composed of copper, like the cell terminals 2 which are connected to the sections 5 of the cell connectors 1. The sections 6 are in this case preferably composed of aluminum, like the cell terminals 2 which are connected to the sections 6 of the cell connectors 1. The dashed line 8 symbolically represents the connection between two electrically conductively designed sections 5, 6 composed of different metal materials. The further sections 7 of the cell connectors 1 are composed of an electrically insulating plastic.

As illustrated in FIG. 1a, the electrically insulating sections 7 are each surrounded by two electrically conductive sections 5, 6. The electrically insulating sections 7 of the cell connectors 1 are connected to the electrically conductive sections 5 and 6 by means of a nano-molding process in the exemplary embodiment illustrated in FIG. 1a. The cell connectors 1 or the electrically conductive sections 5 and 6 of the cell connectors 1 are brought into electrically conductive contact with the cell terminals 2 of the battery cells 3 by means of a laser welding process. The welding seams are in this case symbolically represented by the rectangles 9 in FIG. 1a.

The battery module 4 illustrated by way of example in FIG. 1a has four prismatic battery cells 3, which each have a first cell terminal 2 and a second cell terminal 2. One cell terminal 2 of a battery cell 3 is in this case brought into electrically conductive contact with the positive electrode of the battery cell (illustrated in each case with a "+" sign in FIG. 1a) and the further battery cell terminal 2 of a battery cell 3 is brought into electrically conductive contact with the negative electrode of the battery cell (illustrated in each case with a "−" sign in FIG. 1a). The battery cells 3 of the battery module 4 illustrated in FIG. 1a are in this case arranged next to one another such that two rows of cell connectors which run in parallel next to one another are formed. Owing to the arrangement of the battery cells 3, in each case a cell terminal 2 connected to the negative electrode of a battery cell 3 follows a cell terminal 2 connected to the positive electrode of a battery cell 3. In the exemplary embodiment illustrated in FIG. 1a, the cell terminals 2 which are electrically conductively connected to the positive electrode of a battery cell 3 are composed of aluminum and the cell terminals 2 connected to the negative electrode are composed of copper.

The cell connector 1 illustrated on the left in FIG. 1a in this case electrically conductively connects the cell terminals 2 of the first two battery cells 3 and the cell terminals 2 of the last two battery cells 3, considered from top to bottom. The section 5, 6 of the cell connector 1 which makes contact with a cell terminal 2 is in this case composed of the same material as the respective cell terminal 2. Thus, the sections 6 of the cell connector 1 are composed of aluminum by way of example and the sections 5 of the cell connector 1 are composed of copper by way of example in the illustrated exemplary embodiment. The upper sections 6 and 5 of the cell connector 1 are mutually electrically insulated from the lower sections 6 and 5 of the cell connector 1 by the plastic section 7.

The cell connector 1 illustrated on the right in FIG. 1a electrically conductively connects the cell terminals 2 of the two central battery cells 3, considered from top to bottom. The upper section 5 of the cell connector 1 is electrically insulated from the center sections 6 and 5 of the cell connector 1 by a plastic section 7. Likewise, the lower section 6 of the cell connector 1 is electrically insulated from the center sections 6 and 5 of the cell connector 1 by a plastic section 7.

Figure 1B:
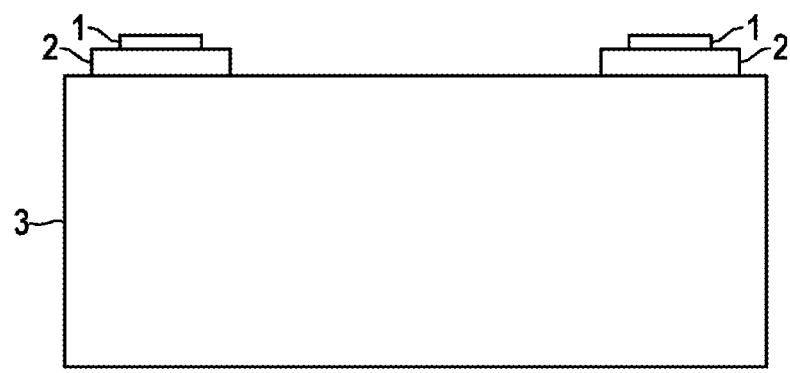
FIG. 1b shows a schematic illustration of a front view of the exemplary embodiment illustrated in FIG. 1a of a battery module with cell connectors according to the disclosure.

FIG. 1b illustrates a front view of the battery module 4 shown in FIG. 1a. As can be seen from FIGS. 1a and 1b, the cell connectors 1 are in each case designed to be substantially strip-like. The cell connectors 1 are in this case planar and have a substantially rectangular cross section. The thickness and the width of the cell connector 1 are constant over the length thereof. In one variant configuration, at least the sections 7 of the cell connectors 1 can be configured to be thinner than the sections 5 and 6 of the cell connectors 1. The battery module 4 is connected in a so-called 4s1p configuration in the present case. That is to say that the four individual battery cells 3 are electrically connected in series.

Figure 2:
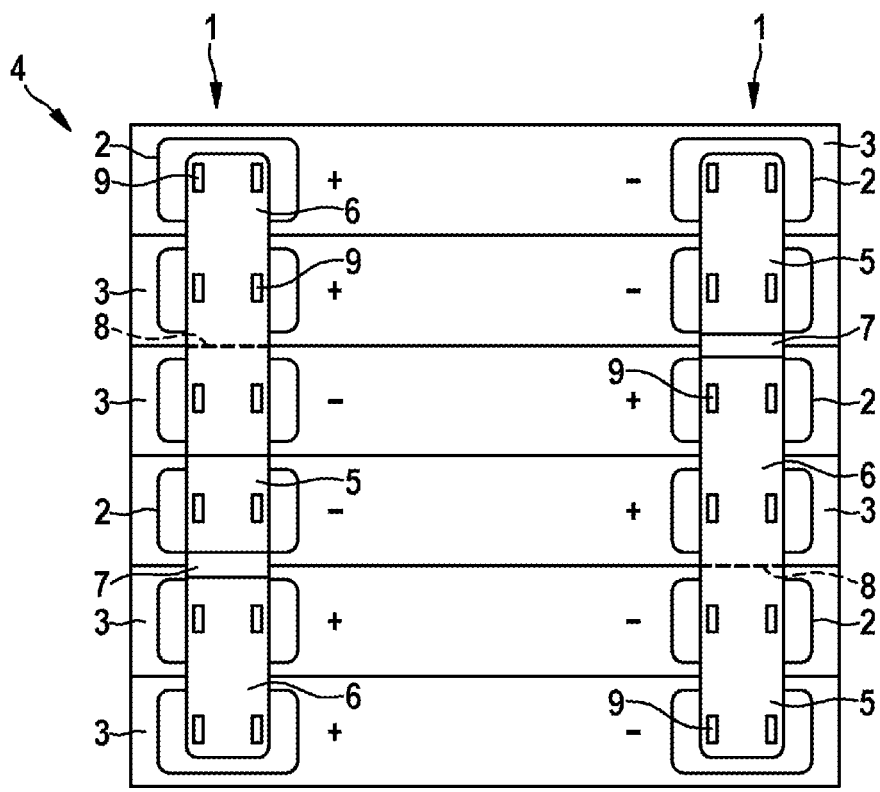
FIG. 2 shows a schematic illustration of a plan view of another exemplary embodiment of the battery module according to the disclosure with cell connectors according to the disclosure.

FIG. 2 illustrates a further exemplary embodiment of a battery module 4 according to the disclosure, wherein the cell terminals 2 of the battery cells 3 of the battery module 4 form two rows running parallel to one another, wherein the first row of cell terminals (illustrated on the left in FIG. 2) is connected to a first cell connector 1 according to the disclosure and the second row of cell terminals 2 (illustrated on the right in FIG. 2) is connected to a second cell connector 1 according to the disclosure.

The six battery cells 3 of the battery module 4 illustrated in FIG. 2 are arranged next to one another such that in each case a first cell terminal 2 of a first battery cell 3 and a second cell terminal 2 of a second battery cell 3, wherein the first cell terminal 2 and the second cell terminal 2 each have the same polarity, are arranged next to one another. The polarity of the cell terminal 2 is in this case illustrated symbolically in FIG. 2 by the "+" sign and "−" sign respectively located next to the cell terminals. The battery cells 3 of the battery module 4 are in this case electrically connected to one another by means of the cell connectors 1 in a so-called 3s2p configuration. That is to say that in each case the two battery cells 3 arranged next to one another, of which the cell terminals 2 have the same polarity, are electrically connected in parallel, wherein the three pairs of battery cells 3 are electrically connected in series.

In order to implement said 3s2p configuration, the cell connector 1 illustrated on the left in FIG. 2 in each case electrically conductively connects the cell terminals 2 of the four upper battery cells 3 and the two terminals 2 of the two lower battery cells 3 to one another. The section 7 of the cell connector 1 is composed of an electrically insulating plastic and in this case prevents all of the cell terminals 2 on the left-hand side from being electrically conductively connected to one another and insulates the respective left-hand cell terminal 2 of the upper four battery cells 3 from the respective left-hand terminal 2 of the lower two battery cells 3 of the battery module 4. The cell connector 1 illustrated on the right in FIG. 2 connects, again considered from top to bottom, in each case the right-hand cell terminal 2 of the two upper battery cells 3 and furthermore the respective right-hand cell terminal 2 of the four lower battery cells 3 of the battery module 4. The electrically insulating section 7 of the cell connector 1 again prevents all of the cell terminals 2 on the right-hand side from being electrically conductively connected to one another.

The cell connectors 1 illustrated in FIG. 2 have in each case four sections. Considered from top to bottom, the cell connector 1 illustrated on the left in FIG. 2 has a first section 6 composed of aluminum, which makes electrically conductive contact with the respective left-hand cell terminal 2 of the two upper battery cells 3 of the battery module 4. A second section 5 composed of copper is joined to said first section 6 of the cell connector 1 by means of a clinch-joining process (illustrated symbolically by way of the dashed lines 8), which second section makes electrically conductive contact with the respective left-hand cell terminal 2 of the two center battery cells 3 of the battery module 4. The first section 5 and the second section 6 are in this case electrically conductively connected to one another. A section 7 which acts in an electrically insulating manner and is composed of plastic is joined to said second section 5 of the cell connector 1 by means of a nano-molding process. In turn, an electrically conductive section 6 composed of aluminum is joined to said section 7 of the cell connector 1 by means of a nano-molding process, which section 6 makes electrically conductive contact with the respective left-hand cell terminal 2 of the two lower battery cells 3 of the battery module 4.

The cell connector 1 illustrated on the right in FIG. 2 has, considered from top to bottom, an electrically conductive section 5 composed of copper, an electrically insulating section 7 composed of plastic arranged next to said section 5, an electrically conductive section 6 composed of aluminum arranged next to said section 7 and a section 5 composed of copper arranged next to said section 6 by means of a clinch-joining process, for example by means of clinching.

According to an advantageous variant configuration which is not illustrated in the figures, the cell connectors 1 are connected to form a single cell connector via at least one connecting section which is preferably electrically insulating. The at least one connecting section is in this case preferably composed of plastic and preferably arranged between two electrically conductive sections by means of a nano-molding process.

The exemplary embodiments illustrated in the figures and explained in connection therewith serve to exemplify the disclosure and are not limiting with respect thereto.

The invention claimed is:

1. A cell connector for making electrically conductive contact with a plurality of battery cell terminals, comprising:
a plurality of sections positioned next to each other including (i) a plurality of first sections composed of an electrically conductive metal material and including a plurality of nanometer-sized cavities in the metal material, and (ii) at least one second section composed of an electrically insulating plastic, the at least one second section positioned between a respective two of the plurality of first sections, and the plastic of the at least one second section extending into the nanometer-sized cavities formed in the metal material of the plurality of first sections to connect the at least one second section to the respective two of the plurality of first sections by a nano-molding process.

2. The cell connector as claimed in claim 1, wherein:
at least one of the plurality of first sections is composed of only a first metal material,
at least one further of the plurality of first sections is composed of only a second metal material, and
the first metal material is different from the second metal material.

3. The cell connector as claimed in claim 2, wherein the at least one of the plurality of first sections is electrically conductively connected to the at least one further of the plurality of first sections by a clinch-joining process.

4. The cell connector as claimed in claim 1, wherein the cell connector is planar with a substantially rectangular cross section.

5. A method for producing a cell connector comprising:
positioning a plurality of sections of a cell connector next to each other including a plurality of first sections composed of an electrically conductive metal material and including a plurality of nanometer-sized cavities in the metal material, and at least one second section composed of an electrically insulating plastic with the at least one second section between a respective two of the plurality of first sections; and
connecting the at least one second section to the respective two of the plurality of first sections by a nano-molding process such that the plastic of the at least one second section extends into the nanometer-sized cavities formed in the metal material of the plurality of first sections to connect the at least one second section to the respective two of the plurality of first sections by the nano-molding process.

6. The method as claimed in claim 5, at least one of the plurality of first sections composed of a first electrically conductive metal material and at least one further of the plurality of first sections composed of a second electrically conductive metal material, the method further comprising:

connecting the at least one of the plurality of first sections to the at least one further of the plurality of first sections by a clinch-joining process.

7. A battery module comprising:
a plurality of battery cells, each battery cell of the plurality of battery cells including a first cell terminal electrically conductively connected to an electrode and in electrically conductive contact with the respective battery cell; and
a first cell connector configured to electrically conductively contact the first cell terminal of each battery cell of the plurality of battery cells such that the battery cells of the plurality of battery cells are at least in part electrically connected to each other, the first cell connector including:
   a plurality of first cell connector sections positioned next to each other and having a plurality of first sections composed of an electrically conductive metal material and including a plurality of nanometer-sized cavities in the metal material, and
   at least one second section composed of an electrically insulating plastic, the at least one second section positioned between a respective two of the plurality of first sections, and the plastic of the at least one second section extending into the nanometer-sized cavities formed in the metal material of the plurality of first sections to connect the at least one second section to the respective two of the plurality of first sections by a nano-molding process.

8. The battery module as claimed in claim 7, each battery cell of the plurality of battery cells further including a second cell terminal, each battery cell of the plurality of battery cells positioned next to each other such that two rows of cell terminals including a first row of first terminals and a second row of second terminals run parallel to each other, the first cell terminals in the first row connected by the first cell connector and the second cell terminals in the second row connected by a second cell connector, the second cell connector comprising:
   a plurality of second cell connector sections positioned next to each other and having a plurality of third sections composed of an electrically conductive metal material and at least one fourth section composed of an electrically insulating plastic, the at least one fourth section positioned between a respective two of the plurality of third sections,
wherein the first cell connector is completely spaced apart from the second cell connector.

9. The method as claimed in claim 5, further comprising:
pretreating the metal material of the plurality of first sections with a chemical pretreatment to form a plurality of nanometer-sized cavities in the metal material; and
spraying the plastic of the at least one second section between the respective two of the plurality of first sections and into the nanometer-sized cavities to form the at least one second section and to connect the at least one second section to the respective two of the plurality of first sections by the nano-molding process.

* * * * *